United States Patent [19]

Mori et al.

[11] Patent Number: 4,502,755
[45] Date of Patent: Mar. 5, 1985

[54] REAR PROJECTION SCREEN

[75] Inventors: Leo Mori, Yokohama; Takashi Aoba, Ageo; Mamoru Tominaga, Yokohama, all of Japan

[73] Assignee: Tokyo Shibaura Denki Kabushiki Kaisha, Kawasaki, Japan

[21] Appl. No.: 450,381

[22] Filed: Dec. 16, 1982

[30] Foreign Application Priority Data

Dec. 23, 1981 [JP] Japan .................. 56-208303

[51] Int. Cl.³ ............................ G03B 21/60
[52] U.S. Cl. .................................. 350/128
[58] Field of Search ............... 350/128, 127, 167, 123

[56] References Cited

U.S. PATENT DOCUMENTS

| | | | |
|---|---|---|---|
| 3,523,717 | 8/1970 | Glenn, Jr. | 350/123 |
| 3,830,556 | 8/1974 | Bratkowski | 350/128 |
| 4,054,907 | 10/1977 | Itoh et al. | 350/128 X |
| 4,078,854 | 3/1978 | Yano | 350/128 |
| 4,147,408 | 4/1979 | Plummer | 350/128 |
| 4,374,609 | 2/1983 | Lange | 350/128 |

FOREIGN PATENT DOCUMENTS 736754 9/1932 France .
48-77830 10/1973 Japan .
51-36932 8/1976 Japan .
51-100723 9/1976 Japan .

Primary Examiner—Richard A. Wintercorn
Attorney, Agent, or Firm—Oblon, Fisher, Spivak, McClelland & Maier

[57] ABSTRACT

In a rear projection screen, a pair of light-refracting plates oppose each other. A plurality of first convex lens elements are arranged parallel to each other on one surface of the light-reacting plate, and a plurality of second convex lens elements are arranged parallel to each other on the other surface of the light-refracting plates. Similarly, a plurality of first convex lens elements are arranged parallel to each other on one surface of the light-refracting plate, and a plurality of second convex lens elements are arranged parallel to each other on the other surface of the light-refracting plate. Each pair of opposed first and second convex lens elements is located along a common optical axis thereof. A convex surface of each first convex lens element is located at a focal plane of the corresponding second convex lens element. A convex surface of each second convex lens element is located on a focal plane of the corresponding first convex lens element. A longitudinal axis of the first and second lens elements of one of the plates is perpendicular to that of the first and second lens elements of the other one of the plates.

10 Claims, 31 Drawing Figures

F I G. 11
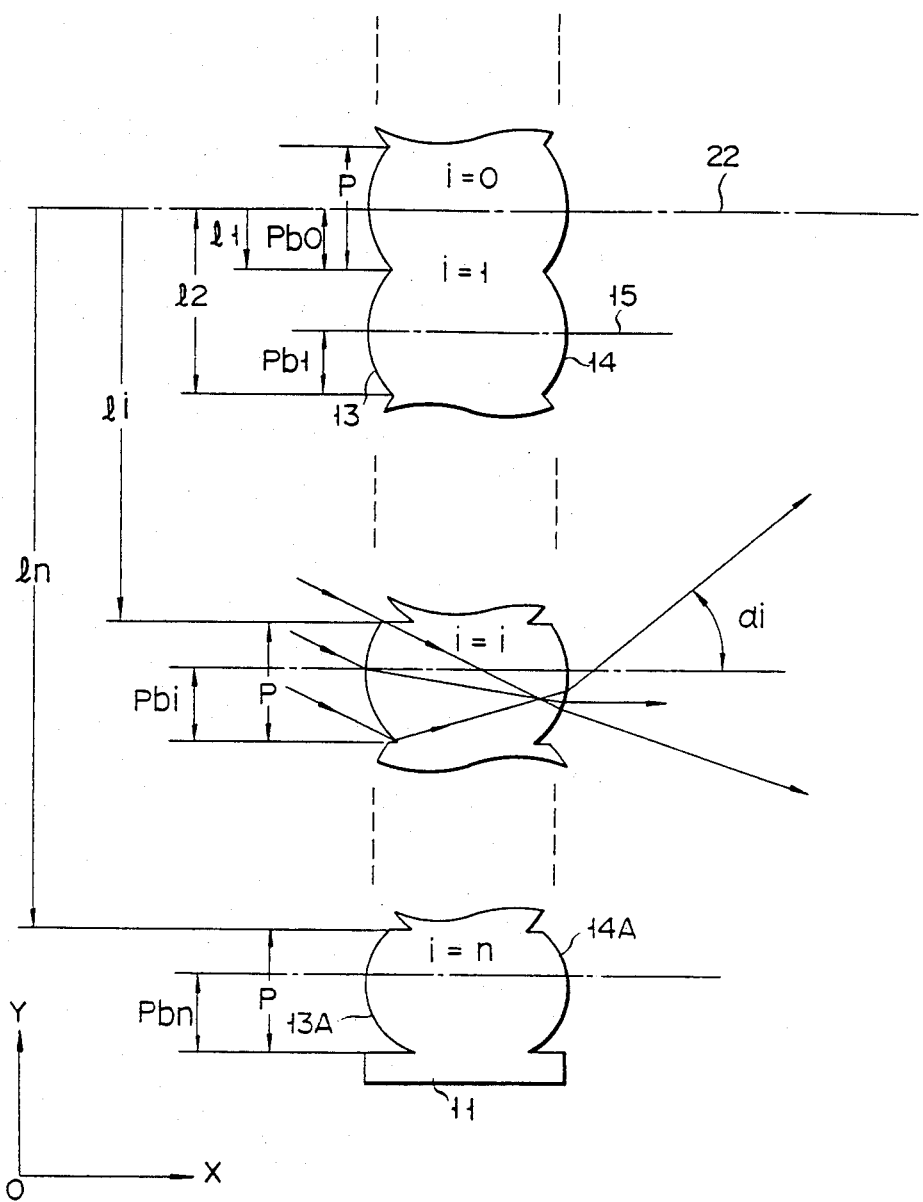

REAR PROJECTION SCREEN

BACKGROUND OF THE INVENTION

The present invention relates to a rear projection screen and, more particularly, to a rear projection screen which has a sufficiently high screen gain, uniform luminance intensity, and uniform color balance at a wide angle of view.

Recently, a rear projection system or a light-transmitting projection system such as a projection television system, a projection screen display system or an enlarged projection system has been widely used. FIG. 1 shows a rear projection system having a rear projection screen 1 and a projecting apparatus 2. In the rear projection system of the type described above, an image signal is separated by a receiver 3 into color signals of red, green and blue. These color signals are supplied to cathode ray tubes 4R, 4G and 4B, respectively. Red, green and blue color images from cathode ray tubes 4R, 4G and 4B respectively are projected onto the rear projection screen 1 through projection lenses 5R, 5G and 5B respectively. The color images are synthesized into a composite picture image, thereby allowing the user to observe the picture image on the rear projection screen 1.

A so-called "a lenticular-lens plate or a lenticulated plate" which has one flat surface and one surface constituted by a number of elongated columnar lenses aligned with each other is known as the rear projection screen 1 to be applied to the rear projection system described above. In addition to the lenticular-lens plate, a Fresnel lens, a diffusing plate, or a combination thereof, is also known as a rear projection screen. However, when these screens are used in the transmitting type of projection system, the cathode ray tubes 4R, 4G and 4B are disposed adjacent to each other and cannot be located in the same position. The optical axes of the projection lenses 5R, 5G and 5B respectively corresponding to the cathode ray tubes 4R, 4G and 4B cannot coincide with each other. As a result, these optical axes cross each other at slightly different angles with respect to the rear projection screen 1, as shown in FIG. 1. The angles of incidence of light rays transmitted from the cathode ray tubes 4R, 4G and 4B to corresponding regions on the rear projection screen 1 differ from each other since a distribution of light on the screen depends on the incidence angle of light rays, color components transmitted onto the screen 1 differ in the respective viewing direction. As a result, uniform luminance distribution cannot be obtained, or luminance of the overall picture image is degraded.

SUMMARY OF THE INVENTION

It is, therefore, an object of the present invention to provide a rear projection screen which has a sufficiently high screen gain, a uniformity of luminance and uniform color balance at a wide angle of view, and which is easy to manufacture.

According to the present invention, there is provided a rear projection screen, which has a pair of light-refracting plates. In each light-refracting plate, a number of cylindrical convex lens elements are so arranged on both its surfaces whose longitudinal axes are parallel to each other and are brought in contact side by side, the convex surfaces of the lens elements constituting the two surfaces of the refracting plate. The lens elements are thus integrally formed as part of the refracting plate. The lens element on one surface of the refracting plate is positioned symmetrical and opposed to the lens element on the other surface thereof. Each pair of opposed lens elements is arranged on its common optical axis. Furthermore, the convex surfaces of the lens elements on one surface are substantially formed at focal plane of the corresponding lens elements on the other surface respectively, and vice versa. The longitudinal axes of lens elements of one of the refracting plate are perpendicular to those of lens elements of the other refracting plate.

BRIEF DESCRIPTION OF THE DRAWINGS

FIGS. 10 and 11 show the relationships between the projection angle and the light rays refracted by the light-refracting plate;

DETAILED DESCRIPTION OF THE PREFERRED EMBODIMENTS

Embodiments of the present invention will be described with reference to the accompanying drawings.

Figure 1:
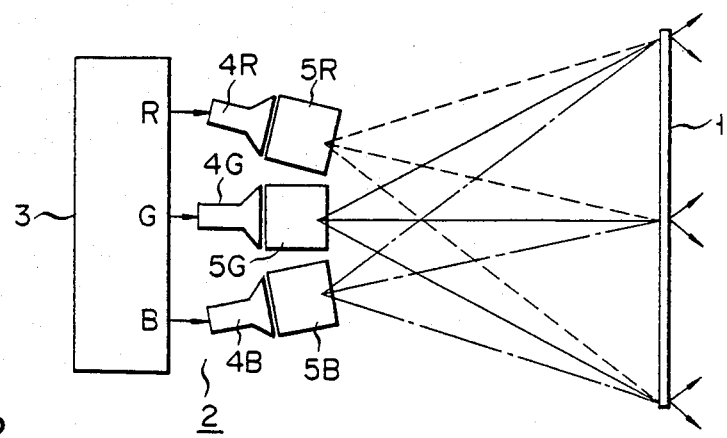
FIG. 1 is a schematic view of a conventional rear projection system.
Figure 2:
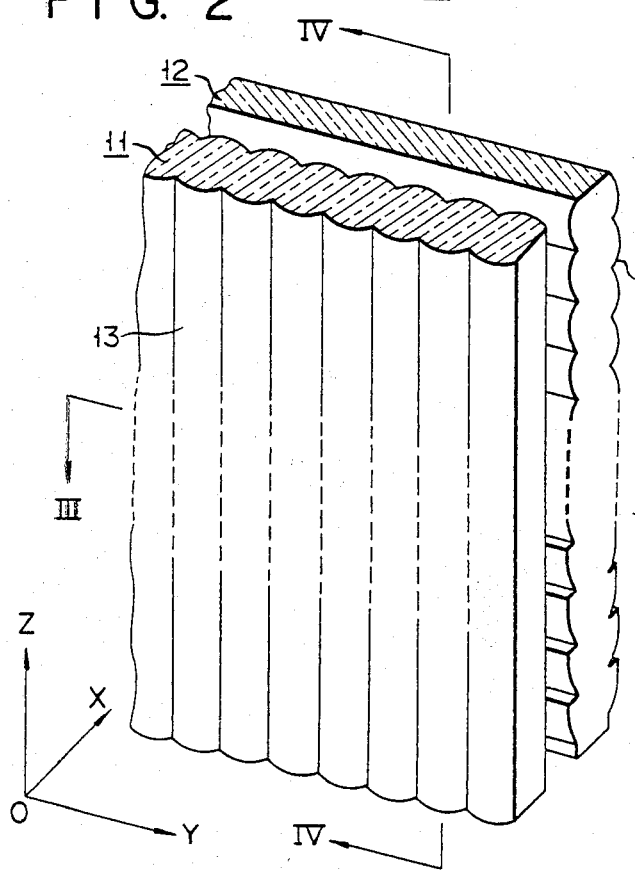
FIG. 2 is a perspective view of a rear projection screen which has a pair of light-refracting plates according to an embodiment of the present invention.

FIG. 2 shows a rear projection screen according to an embodiment of the present invention. The rear projection screen comprises first and second light-refracting plates 11 and 12. The first and second light-refracting plates 11 and 12 are disposed to be brought into contact with each other, or to be spaced apart by a slight gap from each other. The first and second light-refracting plates 11 and 12 are made of an optical refractive material, that is, a transparent material such as transparent glass, or a transparent resin such as an acrylic resin, polyvinyl chloride, polycarbonate, polystyrene and polymethylpentene.

Figure 3:
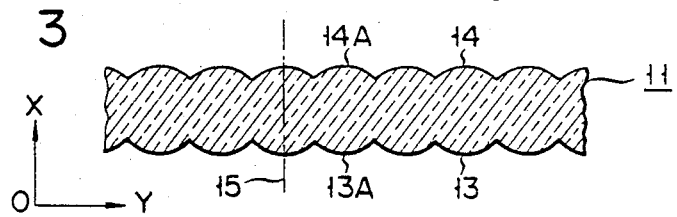
FIG. 3 is a sectional view of one of the light-refracting plate taken along the line III—III in FIG. 2.

A plurality of first cylindrical convex lens elements 13 having cylindrical convex surfaces 13A are arranged on one of the surfaces of the first light-refracting plate 11 in tight contact, side by side, as shown in FIG. 3. A plurality of second cylindrical convex lens elements 14A are also arranged on other surface of the first plate 11 in tight contact, side by side, as shown in FIG. 3. The first and second lens elements 13 and 14 have the same shape and size, longitudinal axes of the first lens elements 13 are aligned parallel to each other along the Z-axis and also longitudinal axes of the second lens elements 14 are parallel to each other along the Z-axis. The first lens elements 13 are positioned symmetrical to the second lens elements with respect to a Z-Y plane. A pair of opposed first and second lens elements 13 and 14 of the first light-refracting plate 11 are located along a common optical axis 15 extending along the X-axis and the longitudinal axes of the first and second lens elements 13 and 14 are thus normal to the optical axes 15. Throughout the specification, a plane is referred to as an optical axis plane which is defined by the optical axis 15 and the longitudinal axes of the lens elements 13 and 14 perpendicular thereto. The convex surface 13A of each of the first lens elements 13 is formed near the focal plane of the corresponding second lens element 14. Similarly, the convex surface 14A of each of the second lens elements 14 is formed near the focal plane of the corresponding first lens element 13. The convex surfaces 13A and 14A of the first and second lens elements 13 and 14 each has a radius of curvature r. In the first light-refracting plate 11, the common optical axis 15 of the first and second lens elements 13 and 14 coincides with the central axis thereof which passes through the lens elements 13, 14 so as to respectively halve the widths of the lens elements 13 and 14. A distance between the central axes of the first and second lens elements is kept at a radius of curvature 1.8 r. In other words, all the first and second lens elements 13 and 14 are arranged at a constant pitch 1.8 r. The thickness of the first refracting-plate 11, that is, the distance between apexes of the convex surfaces 13A and 14A is determined to be 2.3 r to 3.0 r.

Figure 4:
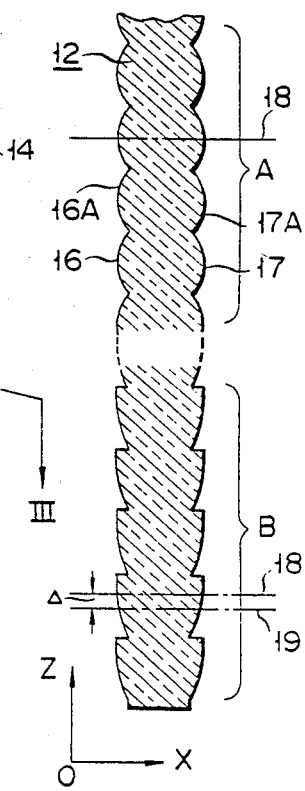
FIG. 4 is a sectional view of the other light-refracting plate taken along the line IV—IV in FIG. 2.

A plurality of first convex lens element 16 having convex surfaces 16A are arranged on one surface of the second light-refracting plate 12 and are brought in tight contact, side by side, as shown in FIG. 4. A plurality of second convex lens elements 17 having convex surfaces 17A are also arranged on the other surface of the second light-refracting plate 12 and are in tight contact, side by side, as shown in FIG. 4. The first and second lens elements 16 and 17 of the second plate 12 have identical widths, but are not identically shaped, unlike the first and second lens elements 13 and 14 of the first plate 11; their shape will be described later. The lens elements 16 and 17 at a central region A of the second plate 12 differ from those at a peripheral region B thereof, as shown in FIG. 4. The first and second lens elements 16 and 17 of the second light-refracting plate 12 have longitudinal axes extending along the Y-axis and perpendicular to the longitudinal axes of the lens elements 13 and 14 of the first light-refracting plate 11. The longitudinal directions are parallel to each other. When any pair of corresponding lens elements 16 and 17 on the two surfaces of the second plate 12 is taken, their longitudinal axes are aligned with a common optical axis 18 extending along the X-axis. The longitudinal axes of the first and second lens elements 16 and 17 are perpendicular to the optical axis 18. The optical axis plane is defined by these longitudinal axes and the common optical axis 18. The convex surface 16A of each first lens element 16 is formed near the focal plane of the corresponding lens element 17. Similarly, the convex surface 17A of each second lens element 17 is formed near the focal plane of the corresponding lens element 16. The convex surfaces 16A and 17A of the first and second lens elements 16 and 17 have a radius of curvature r. The first and second lens elements 16 and 17 of the second light-refracting plate 12 are arranged at a constant pitch (e.g., 1.0 r) and a distance between the central axes thereof is kept constant in the same manner as in the case of the first light-refracting plate 11. As described above, the first and second lens elements 16 and 17 have the same width.

The central axis of the first and second lens elements 16 and 17 located at the central region A of the second light-refracting plate 12 is aligned with the common optical axis 18 in the same manner as in the case of the first refracting plate 11. However, a central axis 19 of the lens element 17 located in the vicinity of the peripheral region B of the second plate 12 is not aligned with the optical axis 18. The optical axis 18 is deviated from the central axis 19 by a maximum deviation Δmax toward the center of the second plate. Any lens element has a deviation which is proportional to the distance from the center of the plate 12. Therefore, the shape of the first and second lens elements 16 and 17 in the central region A differs from that of the first and second lens elements 16 and 17 in the peripheral region B, as shown in FIG. 4. The maximum deviation Δmax is, for example, determined as 0.25 r. The thickness of the second refracting plate corresponds to 2.3 r to 3.0 r in the same manner as in the case of the first refracting plate 11.

Figure 5:
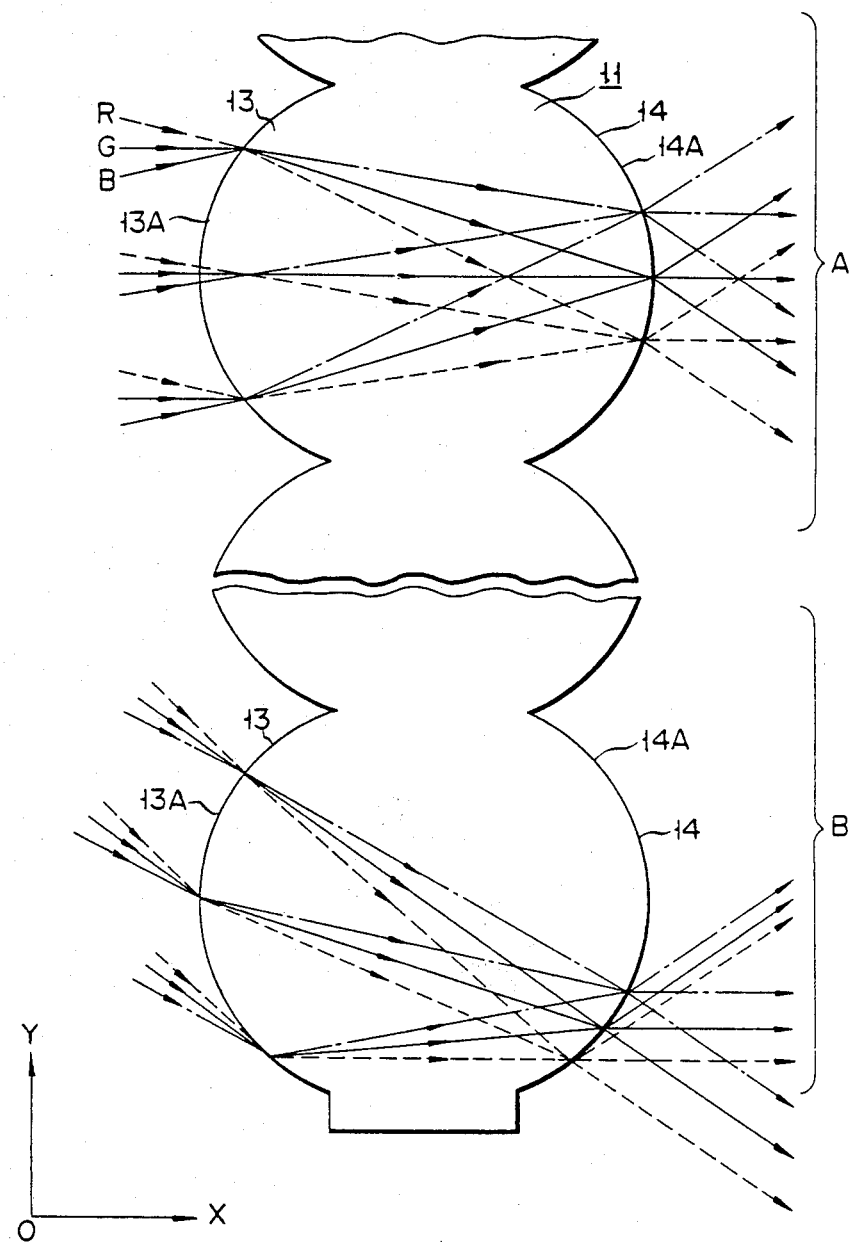
FIG. 5 shows how light rays are transmitted through the light-refracting plate shown in FIG. 3.
Figure 6:
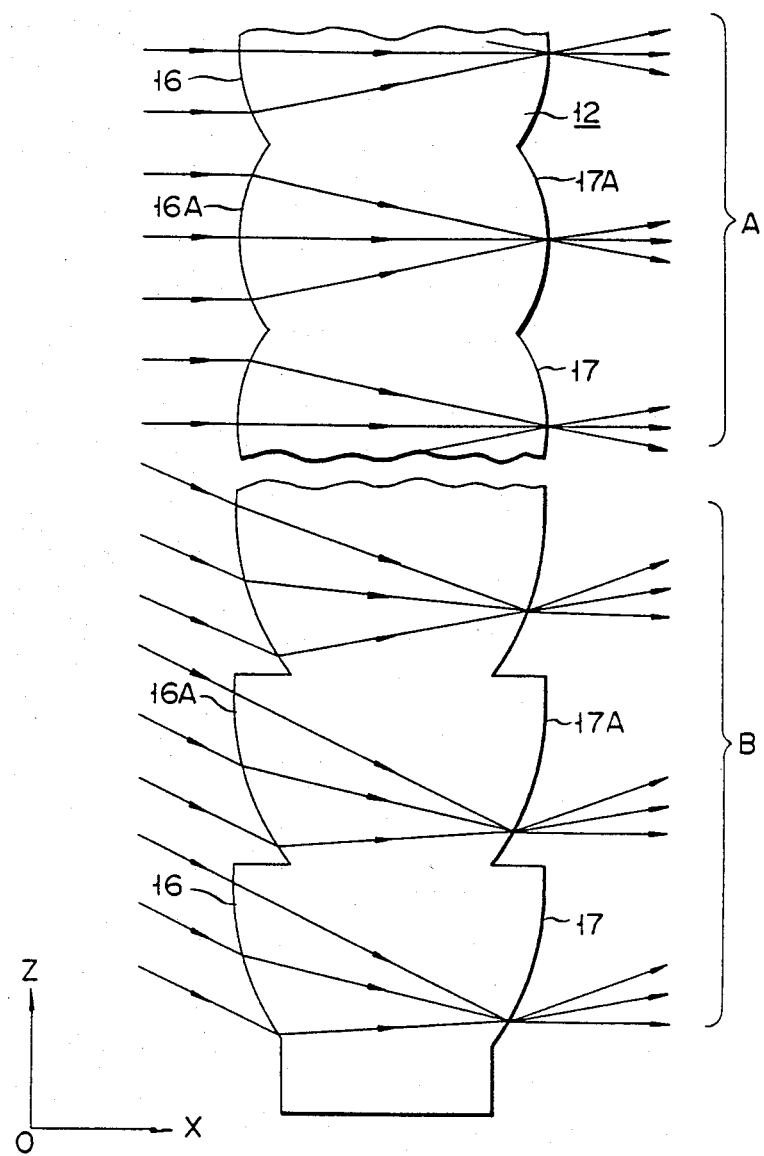
FIG. 6 shows how light rays are transmitted through the light-refracting plate shown in FIG. 4.

The loci of light rays passing through the optical refractor shown in FIG. 2 will be described with reference to FIGS. 5 and 6. The light-refracting plates 11 and 12 shown in FIG. 2 are made of an acrylic resin as the optical refractive material. The radius of curvature of the first lens elements 13 and 16 and the second lens elements 14 and 17 are set to be 1.0 mm. When the material and the radius of curvature are determined in this manner, the convex surfaces of the first lens elements 13 and 16 are substantially aligned with the focal plane of the second lens elements 14 and 17, respectively, and vice versa, thus satisfying the conditions described with reference to the above embodiment. As shown in FIG. 5, red, green and blue light rays R, G and B are projected from the respective cathode ray tubes onto the first light-refracting plate 11 through the respective projection lenses as indicated by broken, solid and alternate long and short dash lines, respectively. The optical axes of the projection lenses are not parallel to each other but are formed slightly different angles between adjacent optical axes. Therefore, the red, green and blue light rays R, G and B are incident on points of the first lens elements 13 of the first plate 11 at different angles of incidence. Since the single component light rays are incident substantially parallel to each other on the convex surface 13A of the first lens element 13, the incident light rays are converged onto the corresponding convex surface 14A of the second lens element 14. In practice, due to the spherical aberration of the first lens element 13, the incident light rays are not converged onto the convex surface of the second lens element 14 but at a point inside or outside the corresponding lens element 14. The light rays then spread from the converged point inside or outside the second lens element 14 at a predetermined angle and are projected outside the first plate 11. In other words, at the central region A, the green light rays G are incident on the first lens elements 13 to be substantially perpendicular thereto. The green light rays G are converged inside the second lens element 14 corresponding to the first lens element 13 on which the light rays are incident. The green light rays G are then projected from the convex surface 14A of the first light-refracting plate 11 within the X-Y plane at a spread angle of about ±35°. The red and blue light rays which are respectively inclined by about 8° and −8° with respect to the green light rays G are converged at points which are slightly deviated from the converged point of the green light rays G inside or outside the second lens element 14. In the same manner as in the case of the green light rays G, the red and blue light rays R and B are projected from the converged points inside the second lens element 14 onto the X-Y plane at a spread angle of about ±35°. Therefore, the red, green and blue light rays which are incident on the central region A of the first light-refracting plate 11 at different angles are respectively transmitted in the direction (X-axis) perpendicular to the first light-refracting plate 11. These light rays are projected to have the same range of angle (±35°).

Similarly, the red, green and blue light rays incident on the peripheral region B of the first light-refracting plate 11 are respectively incident thereon at different angles. However, since the light elements are substantially parallel to each other, they are converged onto the convex surface 14A of the second lens element 14A, and then spread at a spread angle of about ±35°. The principal light rays are substantially projected along the X-axis.

The light rays, which provide uniform luminance distribution on the horizontal surface, that is, on the X-Y plane of the first light-refracting plate 11, are transmitted toward the second light-refracting plate 12. In the second light-refracting plate 12, the red, green and blue light rays R, G and B incident on the lens elements 16 and substantially parallel to each other are converged onto the second lens elements 17, as shown in FIG. 6. The major composite light rays are projected perpendicularly to the convex surface of each second lens element 17 of the second light-refracting plate 12 at a spread angle of about ±17°. The red, green and blue light rays are incident substantially perpendicularly on the central region A of the second refractor plate 12.

The parallel light rays of red, green and blue are converged linearly to the convex surface of the second lens element 17, and composite light rays are produced therefrom. The light rays which have a uniform luminance distribution are incident on the peripheral region B to be parallel light rays. However, as shown in FIG. 6, these are converged at a point inside the second lens element 17 corresponding to the first lens element 16 on which they are incident. They are projected at a spread angle of about ±18°, the principal light ray being inclined upward with respect to the X-axis. It is noted that such a projection is performed by misaligning the optical axis 18 of the first and second lens elements 16 and 17 from the central axis thereof.

Figure 7A:
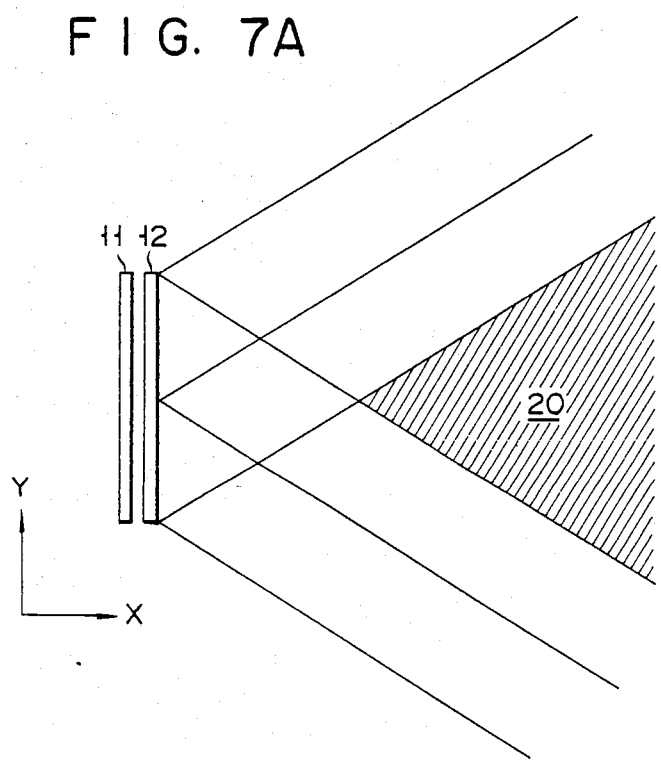
FIGS. 7A and 7B are plan views showing an viewing area of the rear projection screen shown in FIG. 2 on the X-Y and X-Z planes respectively.
Figure 7B:
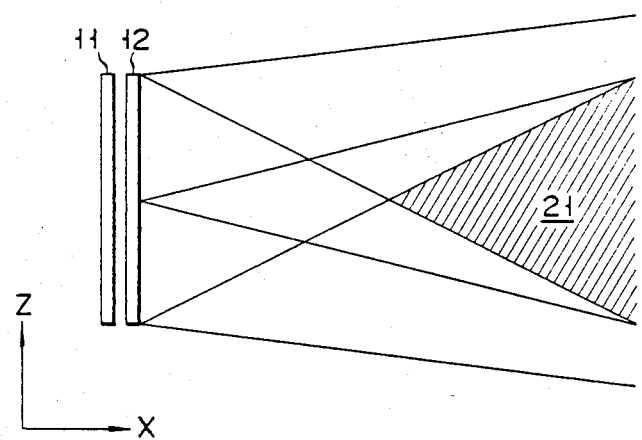

The obtained light rays which have passed through the first and second light-refracting plates 11 and 12 having the structure described above have a predetermined spread angle within both the X-Y plane and the X-Z plane. That is, as shown in FIG. 7A, the light rays have a spread angle of about ±35° in the X-Y plane and their optical axes are parallel to each other. Furthermore, as shown in FIG. 7B, the light rays have a spread angle of about ±18° in the X-Z plane, and these uniform light rays are directed to a central viewing area of the X-Z plane. Viewing areas 20 and 21 indicated by hatched lines as shown in FIGS. 7A and 7B are irradiated by the uniform light rays. When the user observes the picture image, a good color balance is obtained in the areas 20 and 21. Since the light rays are effectively refracted as described above, a high screen gain can be obtained independently of the position of the first and second light-refracting plates 11 and 12. The screen according to the present invention can provide many advantages as follows, (1) The picture image having high and uniform luminance distribution can be formed over the entire screen.

(2) Even if the projectors respectively project the red, green and blue light rays from different positions, the composite light rays can be projected from the rear projection screen within a predetermined spread angle, so that excellent color balance and high luminance can be obtained even if the user observes the screen from different angles.

(3) The effective field of observation can be widened. Furthermore, this effective field of observation can be easily and arbitrarily changed.

(4) The light-refracting plates can be easily manufactured at low cost.

In the above embodiment, FIG. 7A shows a horizontal viewing area on the X-Y plane, while FIG. 7B shows a vertical viewing area on the X-Z plane. The observation zone shown in FIG. 7A differs from that shown in FIG. 7B since the central axis of the first and second lens elements 13 and 14 of the first light-refracting plate 11 used to determine the observation zone in the X-Y plane is aligned with the optical axis of the first and second lens elements 13 and 14, while the central axis of the first and second lens elements 16 and 17 of the second light-refracting plate 12 used to determine the observation zone in the X-Z plane is deviated from the optical axis of the first and second lens elements 16 and 17. In other words, as described above, the viewing areas may be arbitrarily changed on the X-Y and X-Z planes. A rear projection screen for obtaining a wide viewing area will be described with reference to FIGS. 8 to 13.

Figure 8:
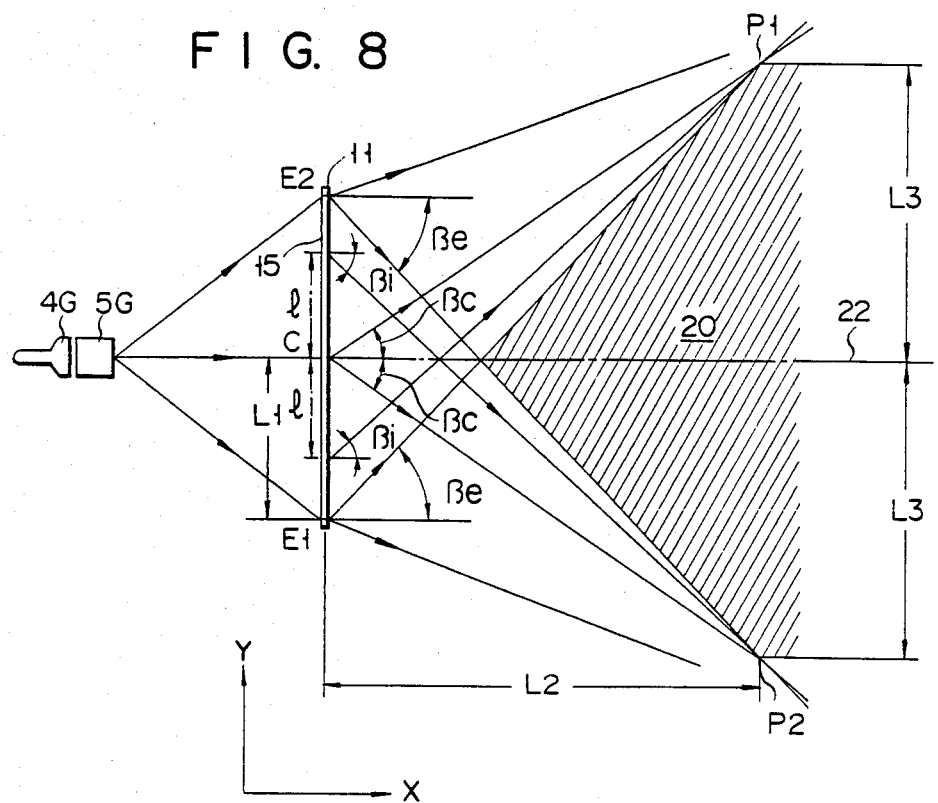
FIG. 8 is a plan view showing an viewing area of a light-refracting plate according to another embodiment of the present invention.

FIG. 8 shows the relationship between the spread angle of the light rays and the viewing area 20 indicated by the hatched portion, when light is projected from the cathode ray tube 4G to the first light-refracting plate 11 through the projection lens 5G and is spread by means of the first light-refracting plate 11. Referring to FIG. 8, the second light-refracting plate 12 for determining the viewing area on the X-Z plane is omitted for simplifing the explanation. Along with this omission, the corresponding cathode ray tubes and projection lenses are also omitted. Thus, the light-transmitting projection system is simplified. The viewing area 20 shown in FIG. 8 is determined such that it is spaced apart by a distance L2 from the first light-refracting plate 11 and subtends at a spread angle corresponding to a distance 2L3. In order to project light rays from the first light-refracting plate 11 over the entire area of the viewing area 20, at least the following conditions must be established. Firstly, the light rays projected from a center C of the first light-refracting plate 11 spread to form an angle between the central axis 22 and a line segment connected between the center C and a point P1 and an angle between the central axis 22 and a line segment connected between the center C and a point P2 of $\beta_c$, respectively. It is noted that the point P1 is spaced apart by a distance L3 from the central axis 22. Therefore, a spread angle of $\beta_c$ must be formed by the two line segments described above. Secondly, the light rays transmitted from one end E1 of the first light-refracting plate 11 are spread to pass through the point P1 such that an angle $\beta_e$ is formed between the X-axis and a line segment connecting the one end E1 of the first light-refracting plate 11 and the point P1. Thirdly, the light rays transmitted from the other end E2 of the first light-refracting plate 11 pass through a point P2 which is spaced apart by a distance L3 from the central axis of the first light-refracting plate 11, such that an angle $\beta_e$ is formed by the X-axis and a line segment connecting the other end E1 of the first light-refracting plate 11 and the point P2. The light rays transmitted from the second lens elements 14 spaced apart by distances $l_i$ from the central axis 22 are spread to pass through the the points P1 and P2 so as to form an angle $\beta_i$ with respect to the central axis 22, respectively. The angle $\beta_i$ is given by equation (1):

$$\beta_i = \tan^{-1}(L3 + l_i)/L2 \qquad (1)$$

Figure 9:
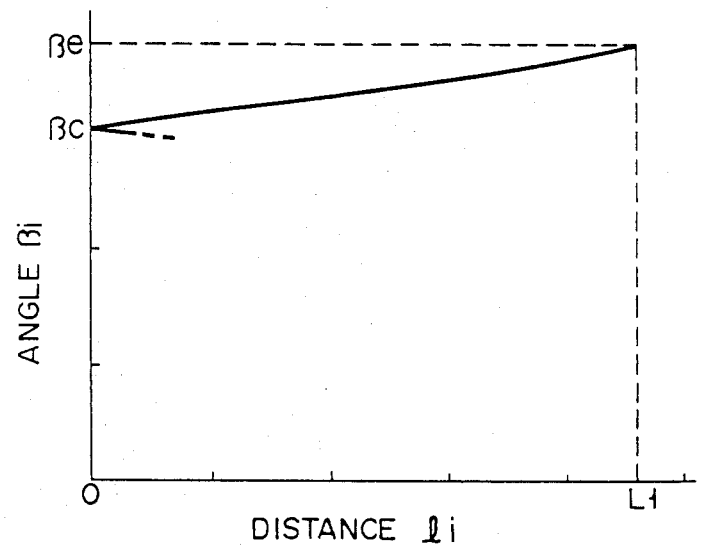
FIG. 9 is a graph showing the angle $\beta_i$ as a function of the distance $l_i$.

The relationship between the angle $\beta_i$ and the distance $l_i$ is shown in FIG. 9. When the distance $l_i$ is increased, the angle $\beta_i$ is proportionally increased, as given by the relation $\beta_i = f(l_i)$.

Figure 10:
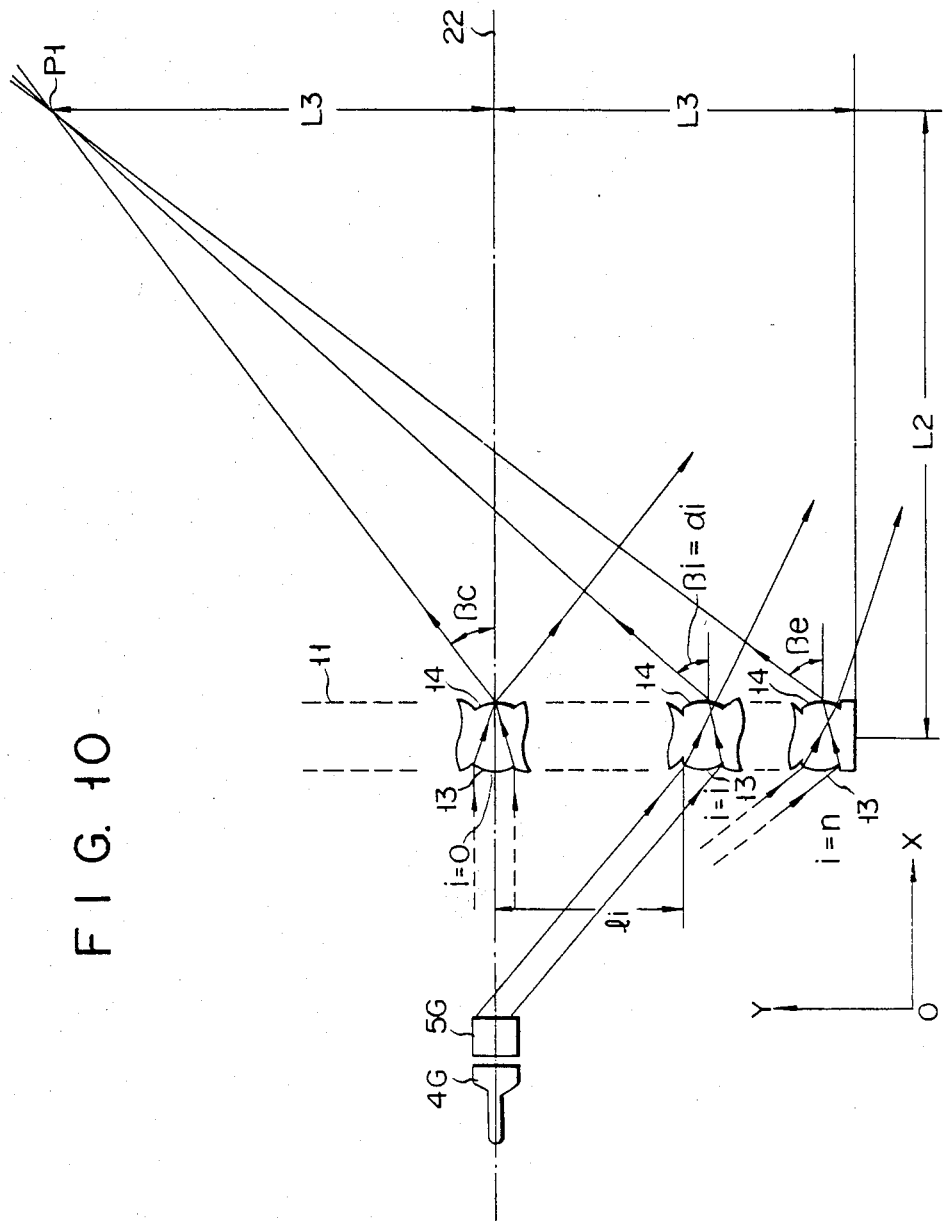
Figure 12:
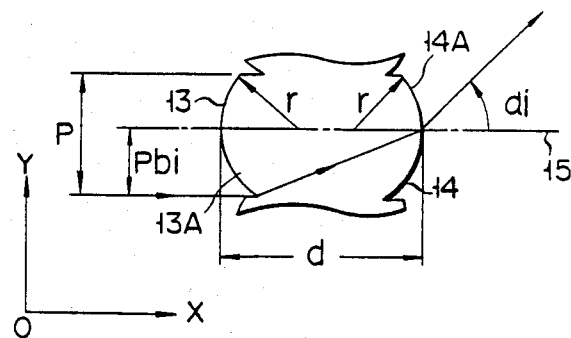
FIG. 12 shows a lens element disposed at an arbitrary position of a light-refracting plate 11.
Figure 13:
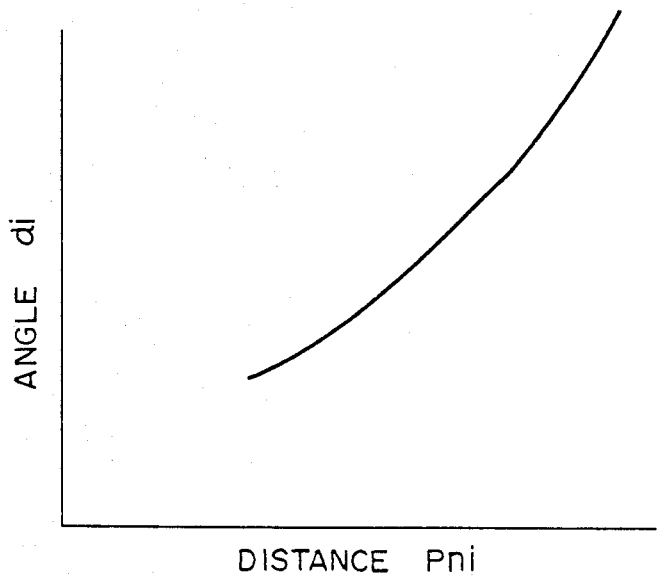
FIG. 13 is a graph for explaining the angle $\alpha_i$ as a function of the distance $P_{bi}$.

Assume that the first light-refracting plate 11 consists of (2n+1) first lens elements 13 and (2n+1) second lens elements 14, as shown in FIGS. 10 and 11. Also assume that the first and second lens elements located on the central axis 22 are defined as 0th (i=0) elements, that the lens elements 13 and 14 each having one end which is spaced apart by the distance $l_i$ from the central axis 22 are defined as ith elements, and that the first and second lens elements 13 and 14 located at the outermost end E1 are defined as nth (i=n) elements. The first and second lens elements 13 and 14 have convex surfaces 13A and 14A respectively, each having a radius of curvature r as shown in FIG. 12. A distance d between the vertexes of the convex surfaces 13A and 14A corresponds to a radius of curvature 2.5 r. All the widths of the convex surfaces 13A and 14A are set at P. The convex surfaces 13A and 14A are aligned on a common optical axis 15, that is, on the optical axis plane. The optical axis plane is spaced apart by a distance $P_{bi}$ from the other end of each of the ith convex surfaces 13A and 14A. The distance from the optical axis plane of the 0th convex surfaces 13A and 14A is $P_{b0}$, while the distance from the optical axis plane of the nth convex surfaces 13A and 14A is $P_{bn}$. As shown in FIG. 12, a light ray incident on the other end of the ith first lens element 13 is refracted therein and is projected from the corresponding second lens element 14 at an angle of $\alpha_i$ between the X-axis and the optical axis 15. At this time, when the angle $\alpha_i$ is increased, the distance $P_{bi}$ is functionally increased given by equation $\alpha_i = g(P_{bi})$. It is noted that the relationship between the angle and the distance may be obtained when the distance d corresponds to the radius of curvature 2.5 r.

As may be apparent from the function $\beta_i = f(l_i)$ of the angle $\beta_i$ and the distance $l_i$ and from the function $\alpha_i = g(P_{bi})$ of the angle $\alpha_i$ and the distance $P_{bi}$, the light ray passing through the ith lens elements 13 and 14 is directed toward the point P1 in accordance with the function $\alpha_i = \beta_i$ (that is, $f(l_i) = g(P_{bi})$). A typical example of the function $f(l_i) = g(P_{bi})$ can be represented by a proportionality ($P_{bi} \propto l_i$) in which the distance $P_{bi}$ may be proportional to the distance $l_i$. The distance $P_{bi}$ may be represented using equation (2) as follows:

$$P_{bi} = a1 + a2 \cdot l_i \qquad (2)$$

where i is an integer ($0 \leq i \leq n$), and a1 and a2 are constants.

All the widths of the lens elements 13 and 14 are set at P, so that the distance $l_i$ is represented by the following equation:

$$l_i = P_{b0} + P(i-1) \qquad (3)$$

The distance $l_i$ obtained from equation (3) is substituted into equation (2), so that equation (4) is obtained as follows:

$$P_{bi} = a1 + a2\{P_{b0} + P(i-1)\} \qquad (4)$$

As shown in FIG. 11, let the distance $P_{bi}$, which satisfies the relation $\alpha_0 = \beta_c$ for i=0, be equal to $P_{b0}$ ($P_{bi} = P_{b0}$). Let the distance $P_{bi}$ which satisfies the relation $\alpha_n = \beta_e$ for i=n be $P_{bn}$ ($P_{bi} = P_{bn}$). Thus constants a1 and a2 are eliminated, so that equation (4) may be represented by equation (5) as follows:

$$P_{bi} = P_{b0} + \{(P_{bn} - P_{b0})/n\} \cdot i \qquad (5)$$

The light-refracting plate 11 which allows a change in the viewing area 20 shown in FIG. 8 can be realized by aligning lens elements 13 and 14 parallel to each other so as to satisfy equation (5).

The deviation $\Delta$ as described above is represented by equation (6):

$$\begin{aligned} \Delta &= P_{bi} - P/2 \\ &= (P_{bn} - P_{b0}) \cdot i/n \end{aligned} \qquad (6)$$

Figure 22:
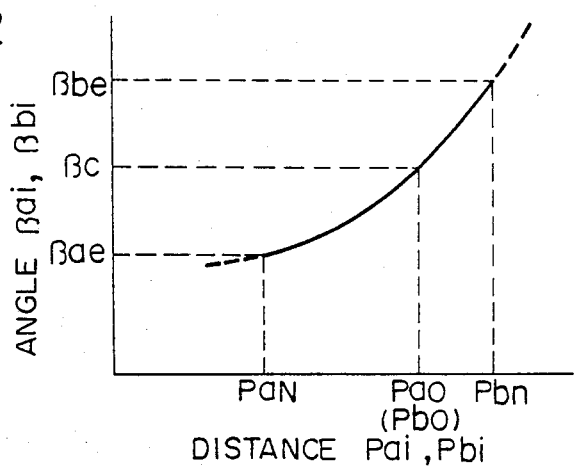
FIG. 22 is a graph showing the angles $\beta_{ai}$ and $\beta_{bi}$ as a function of distances $P_{ai}$ and $P_{bi}$.

In the light-refracting plate 11 described with reference to FIGS. 8 to 13, a desired viewing area 20 can be obtained. The light rays projected from the plate 11 described with reference to FIGS. 8 to 13 reach outside the desired viewing area 20. In an area outside the desired viewing area 20, the user observes the screen under such conditions that the color balance is degraded, and the uniformity of luminance and the screen gain is degraded. These problems can be solved by a rear projection screen according to still another embodiment of the present invention, as shown in FIGS. 14 and 22.

Figure 14:
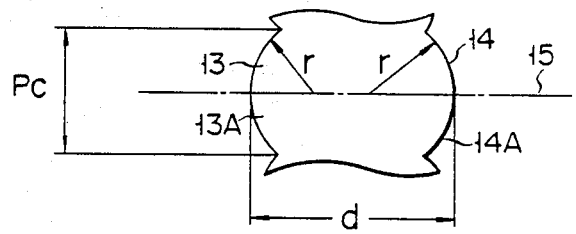
FIGS. 14 and 15 respectively show a lens element disposed at the center and in the vicinity of a light-refracting plate according to still another embodiment of the present invention.
Figure 15:
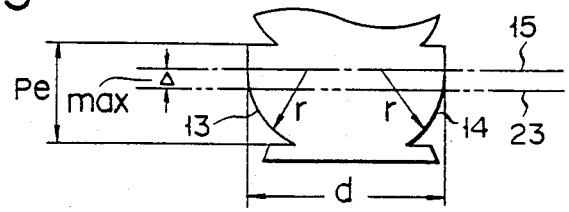

The first light-refracting plate 11 has first and second lens elements 13 and 14 arranged on the central axis 22, which has a fixed width $P_c$ and a central axis aligned with the optical axis 15, as shown in FIG. 14. The width of the first light-refracting plate 11 is decreased depending on the distance from the central axis 22 of the plate. The optical axis 15 or the optical axis plane of any one of the other first and second lens elements 13 and 14 is deviated by a deviation $\Delta$ from the central axis of the element, the deviation $\Delta$ being increased depending on the distance from the central axis 22 of the plate. The outermost ones of lens elements 13 and 14 respectively have a width $P_e$ ($P_e < P_c$) as shown in FIG. 15. The optical axis 15 of the outermost lens elements 13 and 14 is deviated by a deviation $\Delta_{max}$ from the central axis thereof. The first and second lens elements 13 and 14 have convex surfaces 13A and 13B, respectively, such that the convex surface 13A of each first lens element 13 is aligned with the focal plane of the second lens element 14, and the convex surface 14A of the second lens element 14 is aligned on the focal plane of the first lens element 13.

Figure 16:
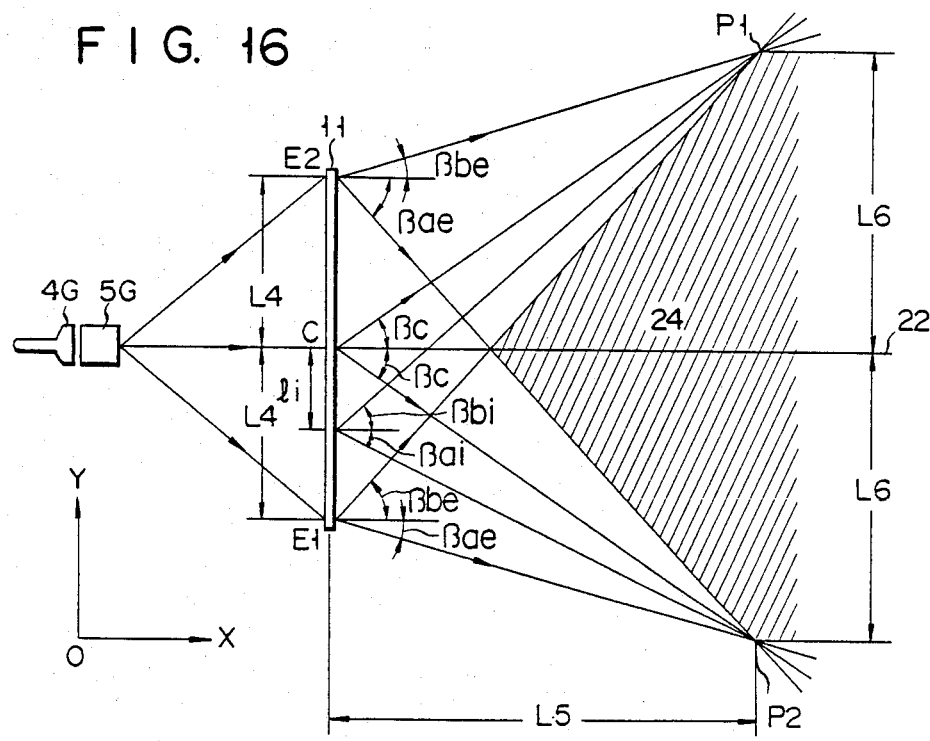
FIG. 16 is a plan view showing an observation range obtained by the light-refracting plate having lens elements shown in FIGS. 14 and 15.

The first and second lens elements 13 and 14 can provide a viewing area 24 indicated by a hatched portion in FIG. 16. The viewing area 24 is defined by a point which is located on the central axis 22 and by the points P1 and P2 which are spaced apart by a distance L5 from the light-refracting plate 11 and spaced apart from each other by a distance corresponding to distance of twice L6. The user can observe a uniform picture image with high luminance and good color balance. Furthermore, high utilization of the light rays is accomplished. In order to obtain the observation zone 24 described above, at least the following conditions must be fulfilled. Firstly, the light rays must be projected from the second lens element 14 at the center C of the first light-refracting plate 11 to the points P1 and P2 respectively at angles of $\beta_c$ respectively with respect to the central axis 22. Secondly, the light rays must be projected from one end E1 of the first light-refracting plate 11 toward the point P1 at an angle of $\beta_{be}$ with respect to the central axis 22 and toward the point P2 at an angle of $\beta_{ae}$ with respect to the central axis 22. Thirdly, the light rays must be projected from the other end E2 of the first light-refracting plate 11 toward the point P1 at an angle of $\beta_{be}$ and toward the point P2 at an angle of $\beta_{ae}$ with respect to the central axis 22. Fourthly, the light rays must be projected from the second lens elements 14 respectively spaced apart by the distance $l_i$ from the central axis 22 toward the point P1 at an angle of $\beta_{bi}$ with respect to the central axis 22 and toward the point P2 at an angle of $\beta_{ai}$ with respect to the central axis 22. The angles $\beta_{bi}$ and $\beta_{ai}$ are obtained from equations (8) and (9) as follows:

$$\beta_{ai} = \tan^{-1}(L6 - l_i)/L5 \quad (8)$$

$$\beta_{bi} = \tan^{-1}(L6 + l_i)/L5 \quad (9)$$

Figure 17:
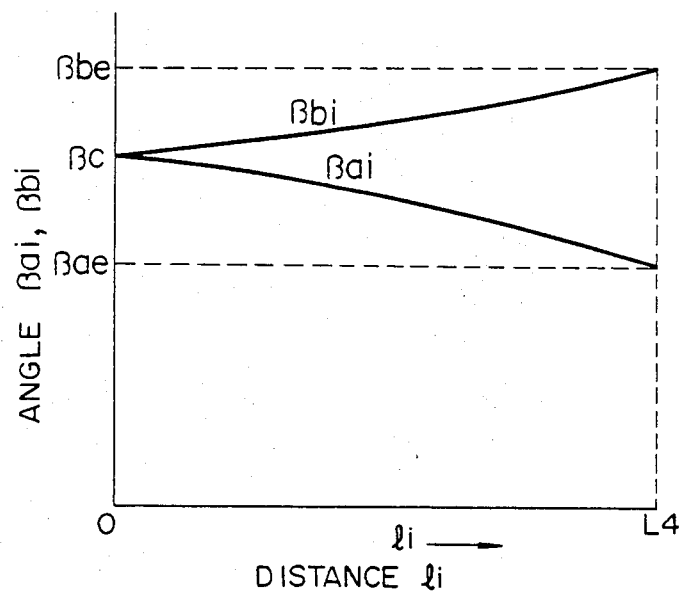
FIG. 17 is a graph showing the angles $\beta_{ai}$ and $\beta_{bi}$ as a function of the distance $l_i$.
Figure 18:
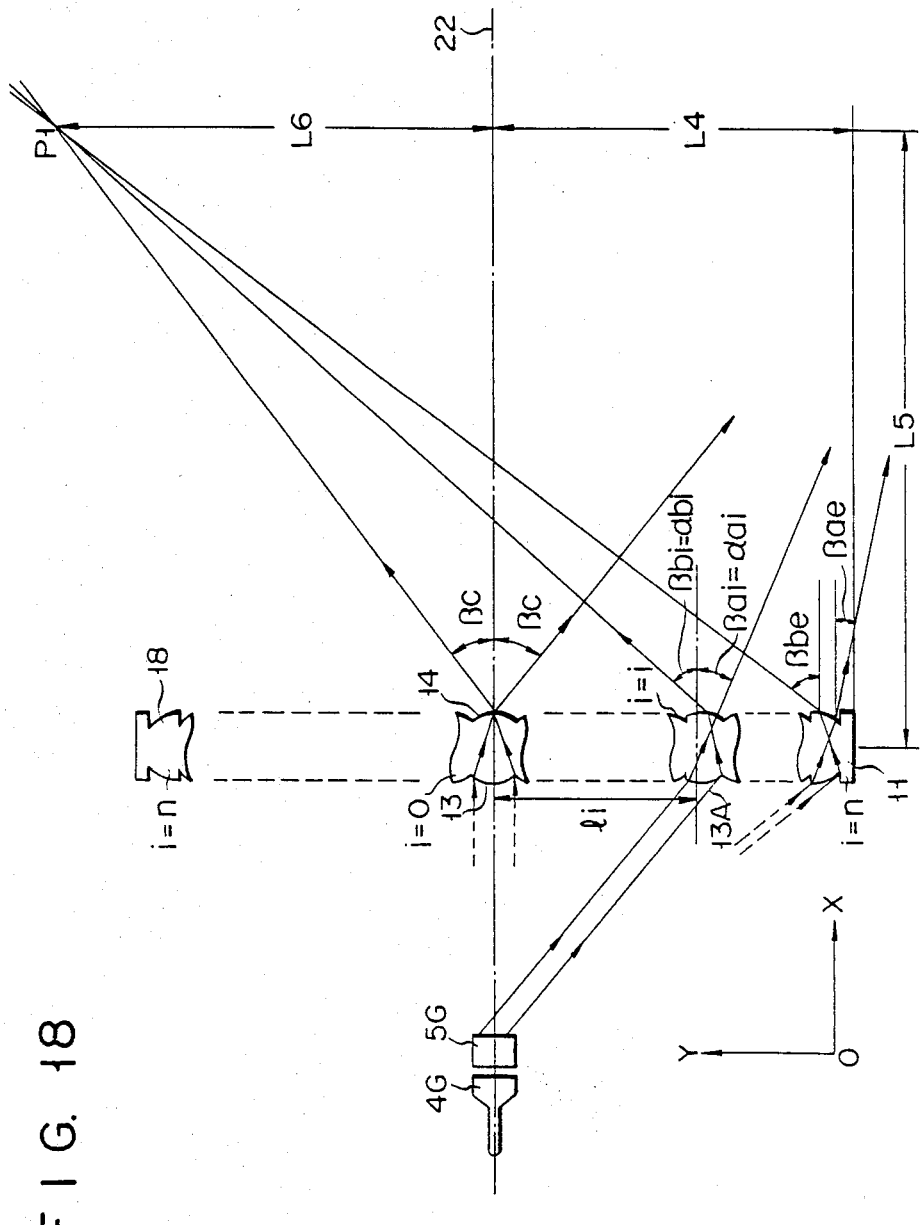
FIGS. 18 and 19 show the relationships between the projection angle and the light rays refracted by the light-refracting plate.

The angle $\beta_{ai}$ and the distance $l_i$ increase together in accordance with the function $\beta_{ai} = f_a(l_i)$, as shown in FIG. 17. Similarly, the angle $\beta_{bi}$ and the distance $l_i$ increase together in accordance with the function $\beta_{bi} = f_b(l_i)$, as also shown in FIG. 17.

Figure 19:
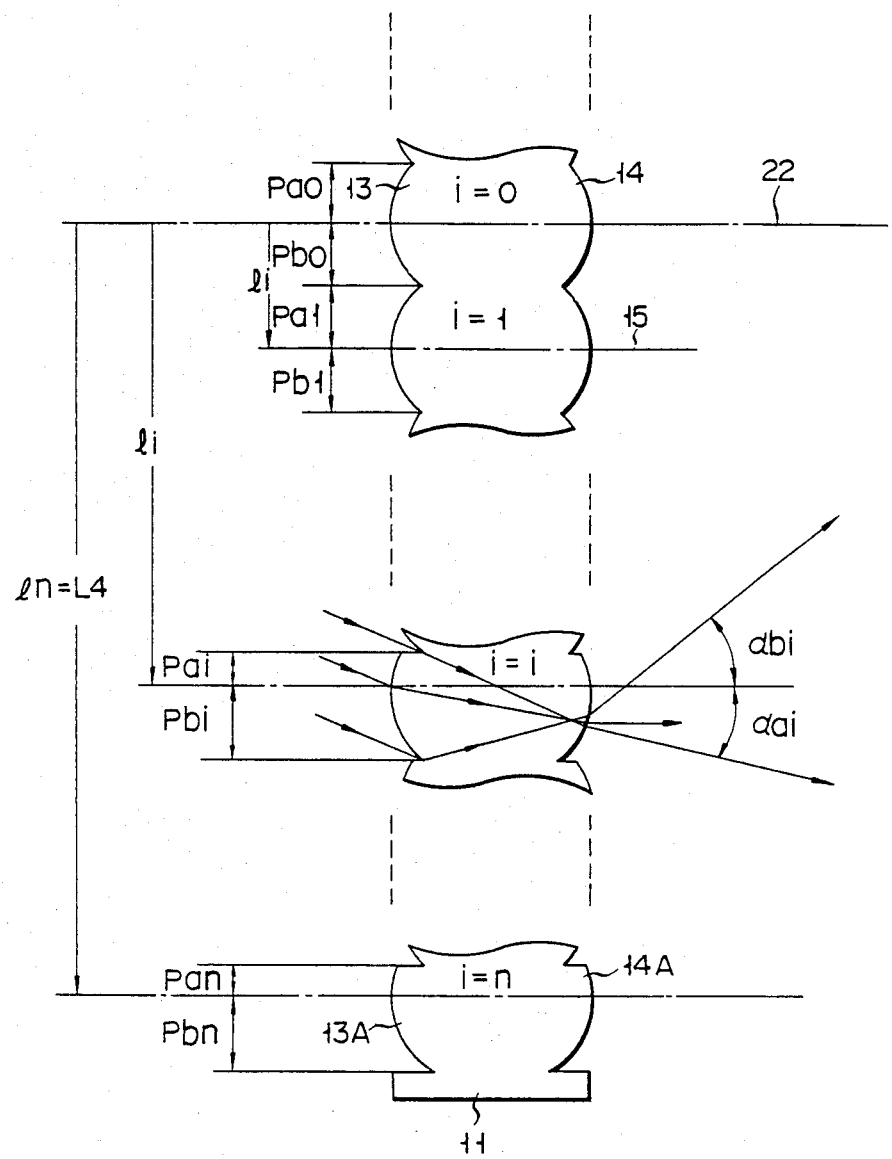
Figure 20:
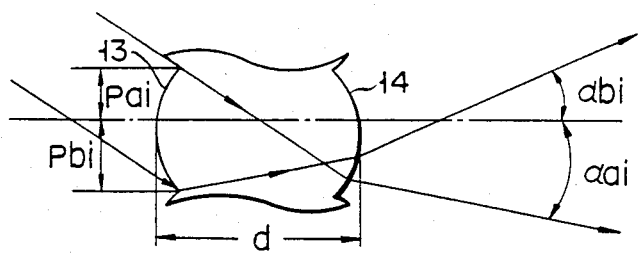
FIG. 20 shows a lens element disposed at an arbitrary position on the light-refracting plate as shown in FIGS. 18 and 19.
Figure 21:
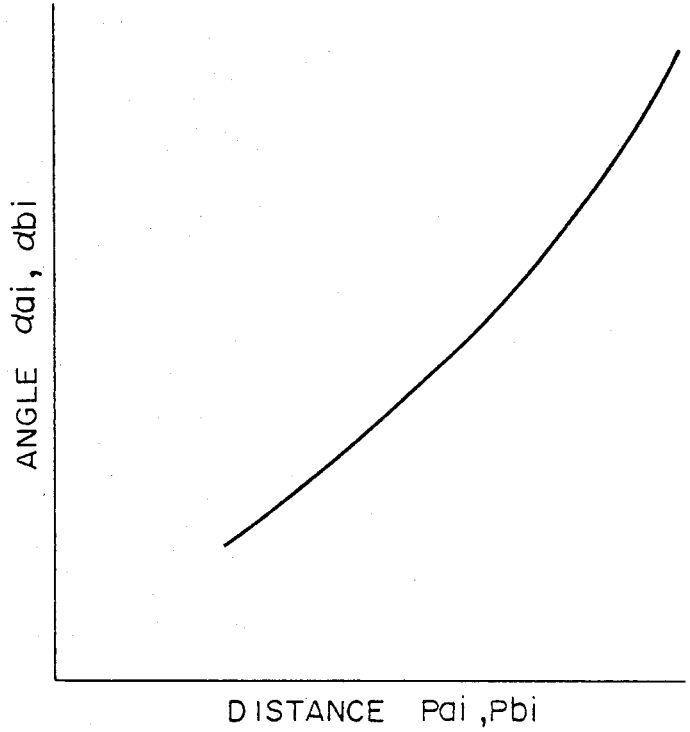
FIG. 21 is a graph showing the angles $\alpha_{ai}$ and $\alpha_{bi}$ as a function of the distances $P_{ai}$ and $P_{bi}$.

Assume that the light-refracting plate 11 comprises $(2n+1)$ first lens elements 13 and $(2n+1)$ second lens elements 14. Also assume that the first and second lens elements 13 and 14 on the central axis 22 are defined as 0th ($i=0$) elements, that the first and second lens elements each of which has one end spaced apart by a distance $l_i$ from the central axis 22 are defined as ith elements, and that the first and second lens elements 13 and 14 respectively located at the outermost end E are defined as nth elements. The 0th, nth and ith lens elements 13 and 14 shown in FIGS. 14, 15 and 20 have convex surfaces 13A and 14A each of which has a radius of curvature r and a thickness d corresponding to a radius of curvature 2.5 r. The convex surfaces are arranged along the optical axis plane 15. A distance between the optical axis plane 15 and one end of each of the ith convex surfaces 13A and 14A is $P_{ai}$, and a distance between the optical axis plane and the other end of each of the ith convex surfaces 13A and 14A is $P_{bi}$. A distance between the optical axis plane and one end of each of the 0th convex surfaces 13A and 14A is $P_{a0}$, and a distance between the optical axis plane and the other end of each of the 0th convex surfaces 13A and 14A is $P_{b0}$. A distance between the optical axis plane and one end of each of the nth convex surfaces 13A and 14A is $P_{an}$, and a distance between the optical axis plane and the other end of each of the nth convex surfaces 13A and 14A is $P_{bn}$. As shown in FIGS. 19 and 20, the light ray incident on one end of the ith first lens element 13 is refracted therein and is projected from the ith second lens element 14 at an angle $\alpha_{ai}$ with respect to the optical axis 15 in the $-Y$ direction. The light ray incident on the other end of the ith first lens element 13 is projected from the ith second lens element 14 at an angle of $\alpha_{bi}$ with respect to the optical axis 15 in the $+Y$ direction. The angle $\alpha_{ai}$ and the distance $P_{ai}$ are increased in accordance with the function $\alpha_{ai} = g_a(P_{ai})$. Similarly, the angle $\alpha_{ai}$ and the distance $P_{bi}$ are increased in accordance with the function $\alpha_{bi} = g_b(P_{bi})$. It is noted that the relationships between the angles and the distances may be obtained from the condition $d = 2.5$ r.

By the function $\beta_{ai} = f_a(l_i)$ of the angle of $\beta_{ai}$ and the distance $l_i$ and the function $\alpha_{ai} = g_a(P_{ai})$ of the angle $\alpha_{ai}$ and the distance $P_{ai}$, the light ray incident on one end of the ith first lens element 13 is, by the assumption of $\alpha_{ai} = \beta_{ai}$ (that is, $f_a(l_i) = g_a(P_{ai})$), directed toward the point P2. By the function $\beta_{bi} = f_b(l_i)$ of the angle $\beta_{bi}$ and the distance $l_i$ and the function $\alpha_{bi} = g_b(P_{bi})$ of the angle $\alpha_{bi}$ and the distance $P_{bi}$, the light ray incident on the other end of the ith first lens element is, by the assumption of $\alpha_{bi} = \beta_{bi}$ (that is, $f_b(l_i) = g_b(P_{bi})$), directed toward the point P1. The functions $f_a(l_i) = g_a(P_{ai})$ and $f_b(l_i) = g_b(P_{bi})$ can be replaced in practice by a proportionality $P_{ai} \propto l_i$, in which the distance $P_{ai}$ is proportional to the distance $l_i$, and by a proportionality $P_{bi} \propto l_i$, in which the distance $P_{bi}$ is proportional to $l_i$. Therefore, equations (10) and (11) are established:

$$P_{ai} = C_{a1} + C_{a2} \cdot l_i \quad (10)$$

$$P_{bi} = C_{b1} + C_{b2} \cdot l_i \quad (11)$$

where i is an integer ($0 \leq i \leq n$), and $C_{a1}$, $C_{a2}$, C1 and $C_{b2}$ are constants.

In equations (10) and (11), a distance $P_{ai}$ which satisfies $\alpha_{a0} = \beta_C$ and a distance $P_{bi}$ which satisfies $\alpha_{b0} = \beta_C$ for the ith firt and second lens elements 13 and 14 are respectively defined as $P_{a0}$ and $P_{b0}$. Distances $P_{ai}$ and $P_{bi}$ which satisfy $\alpha_{an}=\beta_{ae}$ and $\alpha_{bn}=\beta_{be}$ for the nth first and second lens elements are respectively defined as $P_{an}$ and $P_{bn}$. The constants $C_{a1}$, $C_{a2}$, $C_{b1}$ and $C_{b2}$ are thus eliminated from equations (10) and (11). Thus, equations (12) and (13) may be given as follows:

$$P_{ai}=P_{a0}+\{(P_{an}-P_{a0})/L4\}\cdot l_i \quad (12)$$

$$P_{bi}=P_{b0}+\{(P_{bn}-P_{b0})/L4\}\cdot l_i \quad (13)$$

As may be apparent from FIG. 19, equation (14) is established. The $l_i$ obtained from equation (12) is substituted into equation (14). Furthermore, the distance $P_{bi-1}$ is substituted into the obtained relation, so that equation (15) is given as follows:

$$l_i = l_{i-1} + P_{ai} + P_{bi-1} \quad (14)$$

$$l_i = [(P_{a0}+P_{b0})\cdot\{L4-(P_{an}-P_{a0})\}/ \\ \{P_{an}-P_{a0})+(P_{bn}-P_{b0})\}]\cdot \\ [((L4+(P_{bn}-P_{b0}))/\{ \\ L4-(P_{an}-P_{a0})\})^i - 1]] \quad (15)$$

Therefore, equations (12) and (13) may be represented by equations (16) and (17), respectively.

$$P_{ai}=P_{a0}+\{(P_{an}-P_{a0})/L4\}\cdot(P_{a0}+P_{b0})\cdot \\ \{L4-(P_{an}-P_{a0})\}/(P_{an}-P_{a0}+P_{bn}- \\ P_{b0})\times[\{(L4+(P_{bn}- \\ P_{b0}))/(L4- \\ (P_{an}-P_{a0}))\}^i - 1] \quad (16)$$

$$P_{bi}=P_{b0}+\{(P_{bn}-P_{b0})/L4\}\cdot(P_{a0}+P_{b0}) \\ \{L4-(P_{bn}-P_{b0})\}/(P_{an}-P_{a0}+P_{bn}- \\ P_{b0})\times[\{(L4+(P_{bn}-P_{b0}))/(L4'' \\ (P_{an}-P_{a0}))\}^i - 1] \quad (17)$$

The light-refracting plate 11 which provides the viewing area 24 shown in FIG. 16 must have a plurality of first and second lens elements 13 and 14 which are arranged substantially parallel to each other and which satisfy equations (16) and (17).

In order to satisfy the condition $l_n=L4$, x is obtained by equation (18).

$$x=\log[\{L4/(P_{a0}+P_{b0})\}\cdot\{(P_{an}-P_{a0})+ \\ (P_{bn}-P_{b0})\}/\{L4-(P_{an}-P_{a0})\}+1] \\ \div\log[\{L4+(P_{bn}-P_{b0})\}/\{L4- \\ (P_{an}-P_{a0})\}] \quad (18)$$

As a result, the refractor plate has a total of $(2n+1)$ lens elements which is greater than x and is an integer which is close to x. Furthermore, the width of the ith first and second lens elements 13 and 14 can be obtained from equation (19) as follows:

$$P_{ai}+P_{bi}=(P_{a0}+P_{b0})\cdot[1+\{(L4-\Delta P_a)/ \\ L4\}\cdot\{((L4+\Delta P_b)/ \\ (L4-\Delta P_a))^i - 1\}] \quad (19)$$

where $\Delta P_a = P_{an} - P_{a0}$ and $\Delta P_b = P_{bn} - P_{b0}$.

FIG. 22 shows the relationships between the distances $P_{ai}$ and $P_{bi}$ and the angle $\beta_i$. The following equation is established for changes in angles $\beta_{ai}$ and $\beta_{bi}$ for obtaining $(\beta_{ae}-\beta_c)$ and $(\beta_{be}-\beta_c)$, that is, changes $\Delta P_{an}$ and $\Delta P_{bn}$ in distances $P_{an}$ and $P_{bn}$:

$$|\Delta P_a| < |\Delta P_b| \quad (20)$$

According to equation (19), $$P_{ai}+P_{bi} < P_{a0}+P_{b0} \\ \text{for } 1 \leq i \leq n \quad (21)$$

Equation (21) indicates that the width $(P_{ai}+P_{bi})$ of the first and second lens elements 13 and 14 must gradually decrease from the center of the light-refracting plate 11. In general, the projection lens 5G has the characteristic that the amount of light passing through the peripheral portion thereof is decreased. Even though the luminous intensity of the light source 4G is uniform as a whole, the amount of light incident on the peripheral zone of the screen is decreased when light is projected from the light source 4G through the projection lens 5G, that is, when it is projected onto the optical refractor. The luminance at the peripheral zone is lower than that at the central zone of the screen. However, according to the screen of the present invention, since the screen is arranged such that light rays are projected only in the viewing area, a decrease in luminance in the peripheral zone can be minimized. High resolution is generally obtained when the width of the lens elements is small. In the light-refracting plate of the present invention, the width of the lens elements in the peripheral zone is decreased, thereby compensating for degradation in resolution in the peripheral zone. As a result, degradation in resolution can be prevented.

In the rear projection screen according to the embodiment described above, a case has been described in which the width is changed in the first and second lens elements 13 and 14 of the first light-refracting plate 11. Widths of the lens elements 13, 14, 16 and 17 of the first and second light-refracting plates 11 and 12 may be changed. The present invention is not limited to the above embodiments. Various changes and modifications may be made within the spirit and scope of the present invention. For example, first and second light-refracting plates may have lens elements of the same shape and size.

Figure 23:
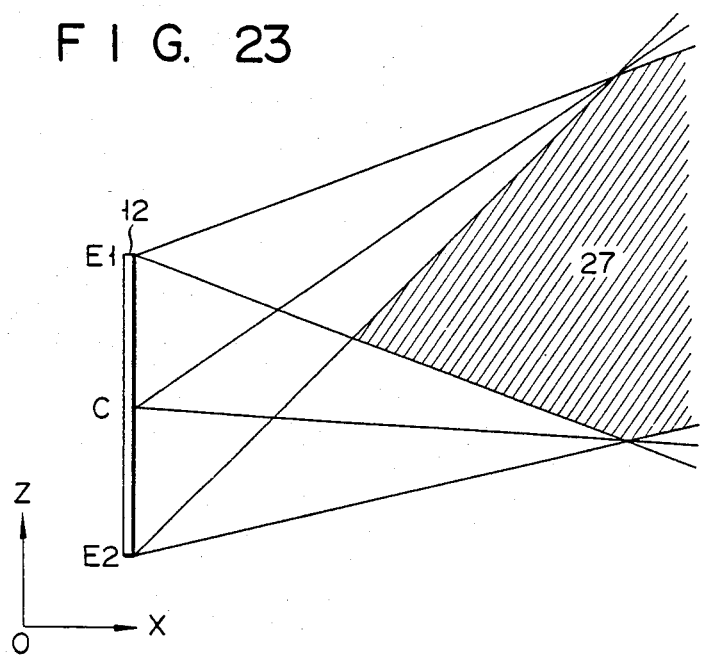
FIG. 23 is a plane view showing a viewing area obtained by a light-refracting plate according to further embodiment of the present invention.
Figure 24:
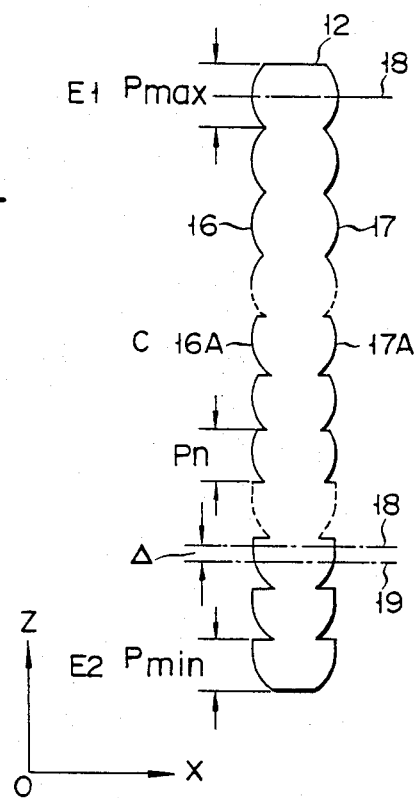
FIG. 24 is a sectional view of one of the refracting-plate shown in FIG. 23.

FIG. 23 shows another rear projection screen according to the invention. This screen is designed to provide a viewing area 27 which extends in a specific direction. That is, a viewer can see an image on the screen when his eyes are positioned a little higher than the screen.

More specifically, the screen of FIG. 23 comprises a first light-refracting plate 11 (not shown) and a second light-refracting plate 12. Like the second light-refracting plates of the embodiments described above, the plate 12 consists of first lens elements 16 arranged on one surface of the plate, side by side and in contact with one another, and second lens elements 17 arranged on the other surface of the plate, side by side in contact with one another. The first lens lements 16 are positioned symmetrical to the second lens elements with respect to a Z-Y plane.

The uppermost first lens element 16 and the uppermost second lens element 17 have the same width $P_{max}$ which is larger than that of any other lens elements 16 and 17. The lowermost first lens element 16 and the lowermost lens element 17 have the same width $p_{min}$ which is smaller than that of any other lens elements 16 and 17. Any lens has a width $P_n$ which is reversely proportional to the distance between it and the upper end E1 of the plate 12. The optical and physical axes of either uppermost lens element are identical. The optical axis of the any other lens element is displaced from the physical axis thereof. The displacement $\Delta$ between the optical and physical axes is proportional to the distance between the lens element and the upper end E1 of the plate 12. Both the width $P_n$ and displacement $\Delta$ are determined in the same manner as in the embodiments described above.

Figure 25A:
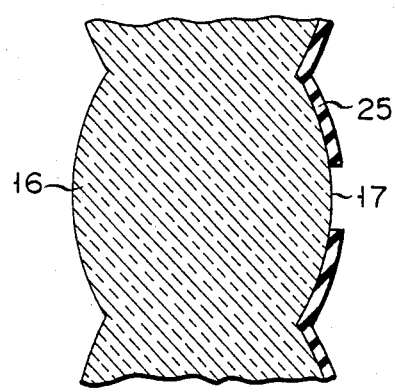
FIGS. 25A, 25B, 26A, 26B, 27A and 27B are sectional views respectively showing modifications of lens elements.
Figure 25B:
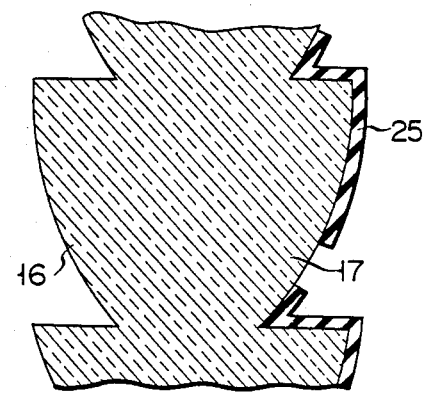
Figure 26A:
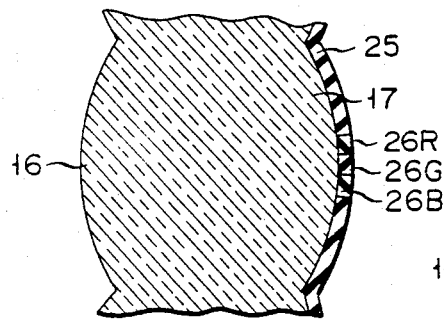
Figure 26B:
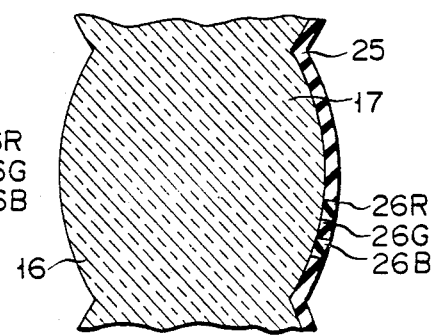
Figure 27A:
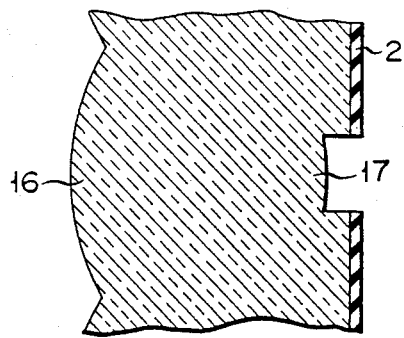
Figure 27B:
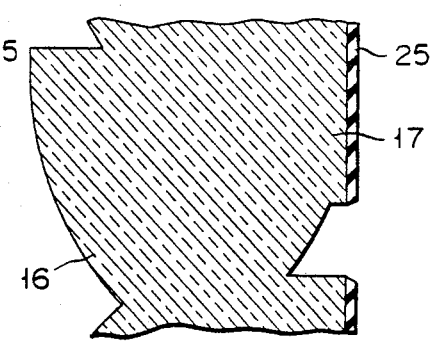

Furthermore, as shown in FIGS. 25A and 25B, a light-shield layer 25 may be formed on the convex surface 17 except for a surface portion through which light rays are projected. The light-shield layer 25 is obtained by blackening the predetermined portion of the convex surface 17. This improves clarity of the picture image by shielding external light, thereby improving the contrast of the picture image with respect to the background. As shown in FIGS. 26A and 26B, color filters 26R, 26G and 26B corresponding to the red, green and blue color components may be formed at the portions from which the light rays are projected, so that selective transmission of the color components is greatly increased, and hence the contrast of the picture image is greatly improved with respect to the background. Alternatively, since the portion which has the light-shield layer 25 thereon is not concerned with light projection in practice, such a portion may be made flat, as shown in FIGS. 27A and 27B. In this case, a blacking process can be eliminated, resulting in low cost. Furthermore, a Fresnel lens may be disposed behind the second refractor plate 12 so as to make it possible for the user to observe the screen as closely as possible.

What we claim is:

1. A rear projection screen, comprising:
   a pair of plates made of a transparent material and each having first and second surfaces;
   a plurality of first cylindrical convex lens elements which respectively have longitudinal axes and convex surfaces, which are respectively integral with each of said pair of plates, and which are arranged continuously on said first surfaces of each of said pair of plates such that the longitudinal axes of said first lens elements of each plate are parallel to each other; and
   a plurality of second cylindrical convex lens elements which respectively have longitudinal axes and convex surfaces, which are respectively integral with each of said pair of plates, and which are arranged continuously on said second surfaces of each of said pair of plates such that the longitudinal axes of said second lens elements of each plate are parallel to each other, each of said longitudinal axes of said plurality of second cylindrical convex lens elements being parallel to that of said plurality of first cylindrical convex lens elements for each said plate, and each of said convex surfaces of said plurality of second cylindrical convex lens elements being adapted to correspond to one of said convex surfaces of said plurality of first cylindrical convex lens elements;
   wherein each pair of said plurality of first convex lens elements and said plurality of second convex lens elements which correspond to each other have a common optical axis, said convex surfaces of said plurality of first convex lens elements are respectively located at focal planes of said plurality of second convex lens elements, said convex surfaces of said plurality of second convex lens elements are respectively located at focal planes of said plurality of first convex lens elements, and said pair of plates are arranged so that the longitudinal axes of first and second convex lens elements of one of said plates are perpendicular to the longitudinal axes of the first and second convex lens elements of the other of said plates.

2. A rear projection screen according to claim 1, wherein said convex surfaces of each said pair of first and second convex lens elements which correspond to each other and formed on each one of said pair of plates have the same size and the same shape.

3. A rear projection screen according to claim 1, wherein said convex surfaces of said each pair of first and second convex lens elements which correspond to each other and formed on each one of said pair of plates have the same radius of curvature r.

4. A rear projection screen according to claim 3, wherein a distance between vertexes of said convex surfaces of said each pair of first and second convex lens elements which correspond to each other on each one of said pair of plates falls within a range of 2.3 r to 3.0 r.

5. A rear projection screen according to claim 1, wherein said plurality of first and second convex lens elements have the same size and shape.

6. A rear projection screen according to claim 1, wherein said common optical axes of predetermined pairs of first and second convex lens elements which are located at a predetermined position of the screen are aligned with central axis of said lens elements, said common optical axes of arbitrary pairs of first and second convex lens elements which are located at an arbitrary position spaced from the predetermined position are deviated by a deviation $\Delta$ from said central axis of said first and second convex lens elements, and said deviation $\Delta$ is increased as a function of the distance between the arbitrary position and the predetermined position.

7. A rear projection screen according to claim 6, wherein said plurality of first and second convex lens elements have the same width.

8. A rear projection screen according to claim 6, wherein the width of said plurality of first and second convex lens elements is decreased in accordance with the distance between the arbitrary position and the predetermined position.

9. A rear projection screen according to claim 1, wherein each of said plurality of first and second convex lens elements of said one of said plates has a light-transmitting section and a light-blocking section covered with a light-shielding layer.

10. A rear projection screen according to claim 9, wherein said light blocking section is covered with a plurality of filter layers for respectively transmitting light rays of specific wavelengths.

* * * * *